United States Patent [19]
Matthews et al.

[11] Patent Number: 6,123,972
[45] Date of Patent: Sep. 26, 2000

[54] METHOD OF PRODUCING UNIFORM SIZED FOOD PRODUCTS

[76] Inventors: Jesse J. Matthews, Rt. 1, Box 158; Blackmon Matthews, 5030 Maxwell Rd., both of Autryville, N.C. 28318

[21] Appl. No.: 08/984,761
[22] Filed: Dec. 4, 1997
[51] Int. Cl.[7] .................................................. A01J 19/00
[52] U.S. Cl. ........................... 426/518; 426/503; 83/167; 83/932; 30/114; 30/289
[58] Field of Search ................................... 426/503, 518; 83/167, 932; 30/114, 289

[56] References Cited

U.S. PATENT DOCUMENTS

| 509,714 | 11/1893 | Andreasen . |
| 890,351 | 6/1908 | Frank . |
| 2,664,741 | 1/1954 | Nicholson . |
| 2,827,658 | 3/1958 | Hoig et al. . |
| 3,363,589 | 1/1968 | Addington . |
| 3,736,088 | 5/1973 | Jimenez . |

Primary Examiner—David Lacey
Assistant Examiner—Hao Mai
Attorney, Agent, or Firm—Mills Law firm PLLC

[57] ABSTRACT

This invention is a tray having a plurality of parallelly disposed open topped, open ended channels. These channels are filled with a mixture to be cooked and a cutting, shaping and dispatching knife is used to remove any excess mixture from the tops and ends of the channels. The knife is then turned over where the blade has a plurality of grooves formed therein to allow the knife to cut the mixture laterally in each channel simultaneously. The blade is then moved longitudinally toward the end of the channels to dispatch the cut mixture from the channels into a cooking medium. Indicia are included on the channels to allow even amounts of mixture to be dispensed each time such mixture is cut.

2 Claims, 2 Drawing Sheets

METHOD OF PRODUCING UNIFORM SIZED FOOD PRODUCTS

BACKGROUND OF INVENTION

1. Field of Invention

This invention relates to cooking and more particularly to the means and method of producing uniform sized food products.

2. Background of Invention

The frying and baking of dough batter, conventional and similar food products, has been around since ancient times.

When uncooked food product is not contained within a muffin pan, bread pan, skillet or the like, but is dispensed directly onto or into the cooking medium, a problem develops in the production of uniform size and thus uniform cooking time products.

Examples of the above are drop biscuits, cookies and the like where the dough is dispensed onto a greased pan with no confinement and are then baked as well as cornmeal which is dropped into boiling grease and is fry cooked. In either case there has always been a problem of dispensing food product to the cooking medium in uniform sizes so that the required cooking time will the same for all of the products in any given batch being cooked. When the products are uneven, the small ones, of course, cook quicker than the larger ones which quite often translates into part of the product being overdone, part of the product being underdone, and hopefully part of the product cooked to the proper doneness.

There are rather complicated and expensive food product dispensing devices used, for example, in restaurants that serve fried cornmeal known as hushpuppies. Because of the size and expense of these dispensing devices, they are not practical for home use or even in the smaller restaurants.

Means of accurately producing food products of uniform size in homes, small restaurants, and even gatherings such as volunteer fire department and church fish fries has not here-to-date been available.

CONCISE EXPLANATION OF PRIOR ART

U.S. Pat. No. 3,363,589 to Andrew C. Addington discloses a dough divider that makes the dough into square sections.

U.S. Pat. No. 2,827,658 to Henry D. Hoig et al. and Edmund Taft discloses a patty roller that makes smooth, uniform thickness square meat patties.

U.S. Pat. No. 3,736,088 to Antonio J. Jimenez discloses a tamale making board wherein a depression is filled with a food material and the excess is scraped off with a flat edge spreader blade.

U.S. Pat. No. 2,664,741 to Roderick Nicholson discloses a mortar form for placing reformed mortar on the end of hollow concrete blocks using a trowel to remove excess mortar.

Finally, U.S. Pat. No. 509,714 to Peter O. Anderson and U.S. Pat. No. 890,351 to Edwin K. Frank both disclose butter molding means.

BRIEF DESCRIPTION OF INVENTION

After much research and study into the above mentioned problems, the present invention has been developed to provide a safe, easy to use means for quickly producing a relatively large number of uniform size food products in a short time for cooking. Because of the uniform size and the fact that they are all placed in the cooking medium at approximately the same time, the cooking time for all products will be the same. In other words, since the products are all the same size and are put in the cooking medium at the same time, they can be batch cooked.

The above is accomplished through the use of a tray with a plurality of open ended channels and a cutting, shaping and dispatching knife.

To use the means of the present invention, the mixture to be cooked is placed in the channels and the flat shaping side of the cutting shaping and dispatching knife is used to remove any excess from the open top and ends of the said channels. The knife is turned over to the cutting side, which is slotted so that it nestles in the channels, and used to cut the mixture to be cooked. The knife is then moved toward the end of the channels to dispatch the cut, uncooked food product therefrom into the cooking medium.

As a more specific example of the above, hushpuppy mix is prepared and placed in the channels of the tray and the back of the knife is used to remove the excess from the top and the open end. The knife is then turned over, pushed down into the channels a predetermined distance from the end of such channels and is then used to slide the cut off amount of mix into the cooking oil or grease. This cutting and dispensing can be rapidly repeated until all of the mix is removed from the tray. It can then be quickly refilled and the process repeated.

Since there are indicia on the channels at predetermined intervals, all of the products dispensed are virtually of identical size.

OBJECTS OF THE INVENTION

In view of the above it is an object of the present invention to provide a means for readily and accurately dispensing uniform size food products for cooking.

Another object of the present invention is to provide a dough and batter measuring and dispensing means.

Another object of the present invention is to provide a food mix portion sizing and dispensing means that can be quickly emptied and refilled.

Another object of the present invention is to provide a method of dispensing uniform sized food product mixes for cooking.

Another object of the present invention is to provide a method of sizing and dispensing hushpuppy mix.

Another object of the present invention is to provide a method of producing a relatively large number of equal sized hushpuppies in a short period of time.

Other objects and advantages of the present invention will become apparent and obvious from a study of the following description and the accompanying drawings which are merely illustrative of such invention.

DETAILED DESCRIPTION OF INVENTION

Figure 1:
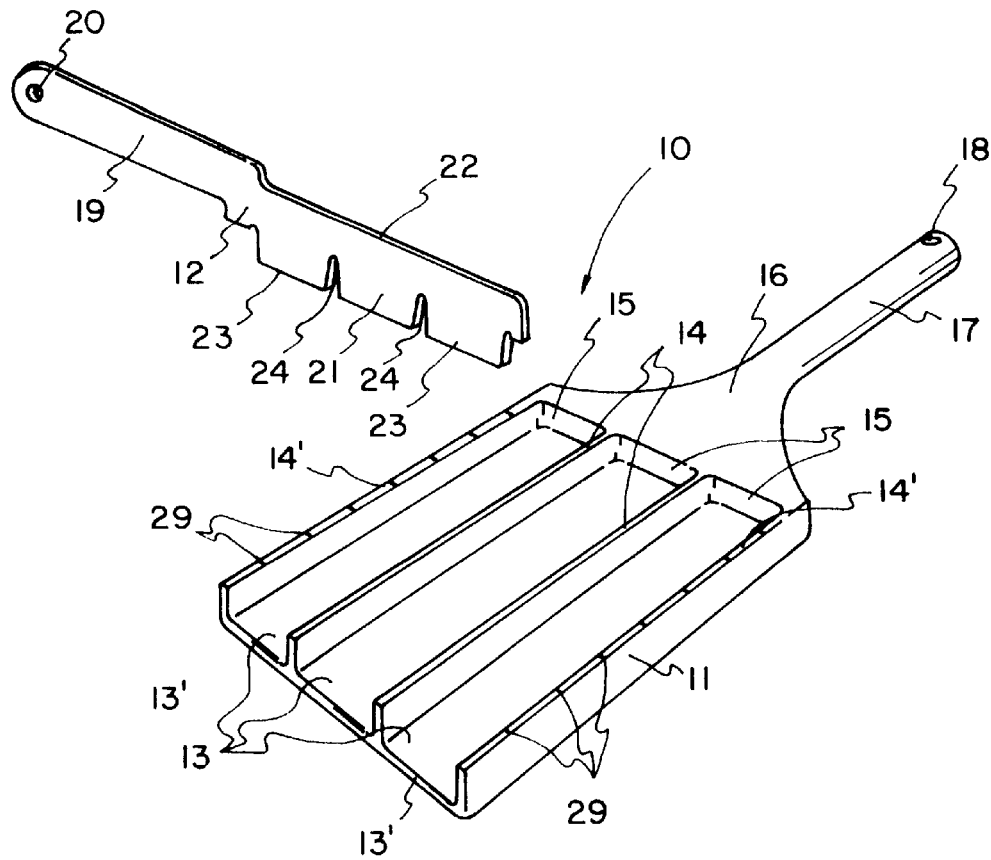
FIG. 1 is a top plan view of a multi-channeled dough and batter tray with the cutting, shaping and dispatching knife laid thereacross.

The means for producing uniform size food products, indicated generally at 10, includes a tray 11 having a plurality of open ended channels 13 separated by partition walls 14.

The closed end 15 of the channels 13 has a molded shank portion 16 with an outwardly projecting handle 17. An opening 18 is formed in the end of handle 17 to allow the tray to be suspended during storage.

A shaping, cutting and dispatching knife 12 includes a handle portion 19 with an opening 20 in the end thereof for suspending same during storage. This opening, of course, could also be threaded for a tether if so desired.

The blade portion 21 of knife 12 has a generally flat edge 22 for smoothing and shaping food product mixture placed in the channels 13.

Figure 2:
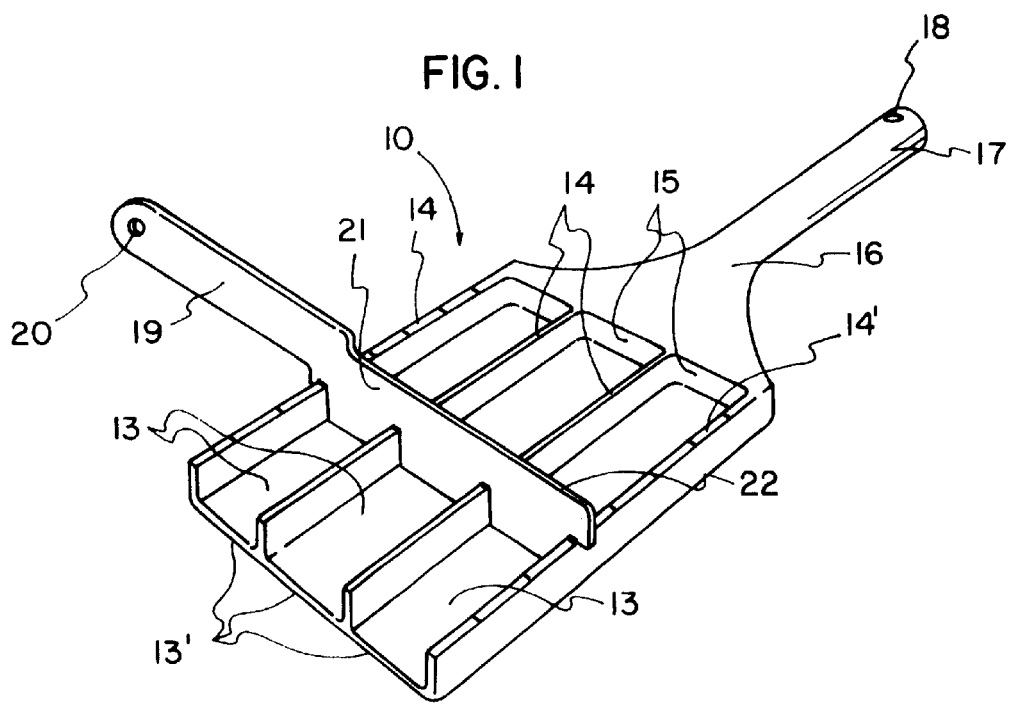
FIG. 2 is a top plan view of the tray with the knife in dispatching position.

Opposite the flat edge 22 blade 21 is a cutting edge 23 with grooves 24 that are adapted to receive the partitions and side walls 14' of tray 11 as clearly seen in FIG. 2.

When dough, batter, cornmeal food or other product mixtures is ready to be cooked, a pan 25 can be placed on the heating eye 26 of stove 27 and grease or cooking oil 28 therein is brought to a boil.

Figure 3:
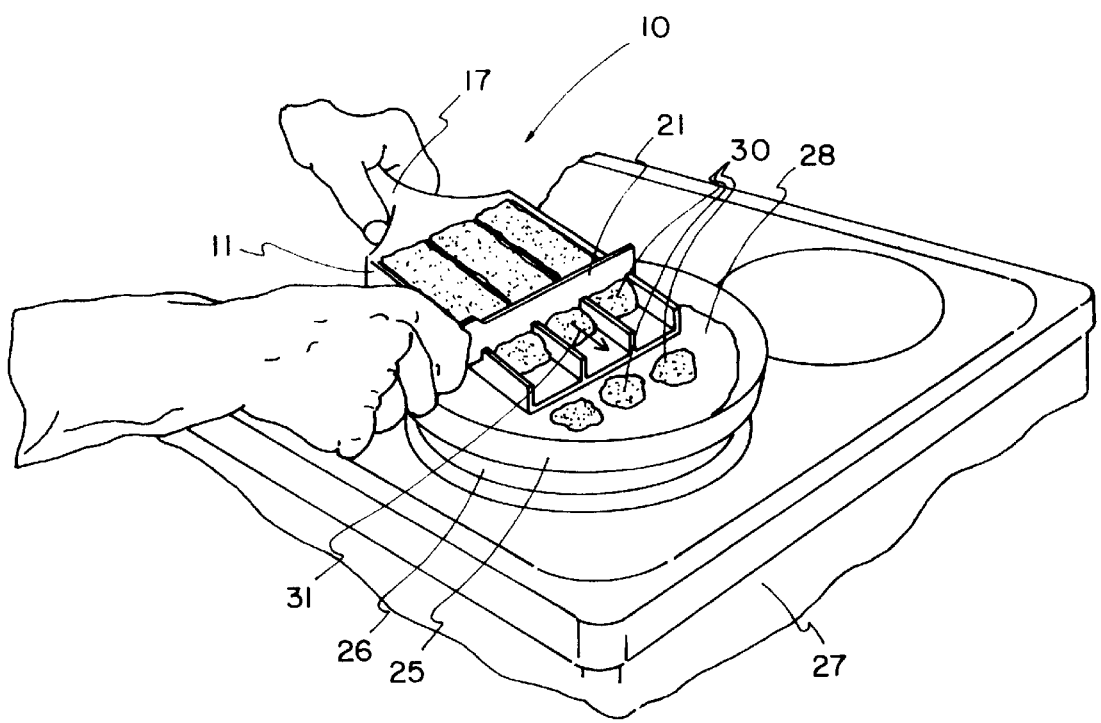
FIG. 3 is a perspective view of a food product such as hushpuppy mix being dispensed into hot grease for cooking.

The product to be cooked is placed in the channels 13 of tray 11 and the flat, shaping edge 22 of knife 12 is used to scrape excess product from the top of the channels and the open ends thereof. The knife 12 is then turned over and the grooves 24 of the cutting edge 23 are placed over the longitudinal channel walls 14. Equal space indicia 28 molded on the top of the outside longitudinal walls 14' are used to align where the cutting edge 23 of knife 12 is pressed down into the product to be cooked. The handle 17 of tray 11 is used to dispose the open ends 13' of the channels 13 over the pan 25 which contains boiling cooking grease or oil 28. The knife 12 is then moved toward the open end 13' of the channels 13 as indicated by the arrow 31 in FIG. 3 which dispenses the cut product from the tray into the pan.

The cutting edge 23 of knife 12 is again disposed over the product to be cooked at the next indicia 29 and the same moved to the open end 13' of the channels 13 to dispense additional equal sized product into the cooking medium.

Once all the product 30 to be cooked has been cut and dispensed into the cooking medium, the channels 13 can be refilled, smoothed out and the dispatching continued until the desired number of equal sized products have been placed in the pan.

Once the product has been cooked for the appropriate amount of time, the same can be removed from the pan and all of the equal sized, now cooked, product will be of even doneness.

The means for producing uniform sized food products 10 of the present invention can not only be used for a product such as deep fat fried hushpuppies and the like, but it can also be used for dispensing drop biscuits, cookies and the like on flat baking sheets.

The tray 11 and shaping, cutting and dispatching knife 12 are both made from Food and Drug Administration Approved plastic that is heat resistant and dish washer safe.

From the above, it can be seen that the present invention provides a means for producing and rapidly dispatching uniform sized food products. This means can be made from recyclable plastic that is heat resistant, dishwasher safe and approved for use with food. It is easy to use, can easily be cleaned up after use and can be compactly stored when not in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of producing uniform sized food products comprising:

providing a tray having at least one open topped, and open ended channel therein;

filling at least one of said at least one channel with a food product;

removing any excess food product from above the open top of said at least one channel;

removing any excess food product from outside of the open end of said at least one channel;

pressing a cutting means laterally through the food product at a predetermined distance from the open end of said at least one channel; and moving the cutting means longitudinally to a point adjacent the open end of said at least one channel so that a predetermined amount of the food product is moved to said open end of said at least one channel whereby a predetermined amount of the food product can be dispatched.

2. The method of claim 1 wherein said at least one open top and open end channel comprises a plurality of open topped, open ended parallel channels.

\* \* \* \* \*